United States Patent [19]

Ghirardo et al.

[11] Patent Number: 5,677,068
[45] Date of Patent: Oct. 14, 1997

[54] COMPOSITION BASED ON PROPYLENE POLYMER AND OBJECT MANUFACTURED FROM THIS COMPOSITION

[75] Inventors: Ursula F. Ghirardo, Kingwood, Tex.; Veerle Deblauwe, Londerzeel, Belgium

[73] Assignee: Solvay (Societe Anonyme), Brussels, Belgium

[21] Appl. No.: 642,204

[22] Filed: May 6, 1996

Related U.S. Application Data

[63] Continuation of Ser. No. 172,709, Dec. 27, 1993, abandoned.

[51] Int. Cl.$^6$ .............................. B32B 27/32; B32B 15/08
[52] U.S. Cl. ........................ 428/500; 428/458; 428/461; 524/450
[58] Field of Search .................. 524/450; 428/458, 428/461, 500

[56] References Cited

U.S. PATENT DOCUMENTS

| | | | |
|---|---|---|---|
| 4,795,482 | 1/1989 | Gioffre et al. | 55/75 |
| 4,826,497 | 5/1989 | Marcus et al. | 604/359 |
| 5,137,955 | 8/1992 | Tsuchiyo et al. | 524/310 |
| 5,256,173 | 10/1993 | Rastelli | 95/141 |

FOREIGN PATENT DOCUMENTS

| | | | |
|---|---|---|---|
| 0 277 168 | 7/1987 | European Pat. Off. | |
| 83/11139 | 7/1981 | Japan | |
| 5811822 | 7/1983 | Japan | B29D 7/24 |

OTHER PUBLICATIONS

"Zeolite Molecular Sieves", D.W. Breck, Wiley Inter-science, 1974, pp. 133–180.
Macromolecules, vol. 6, No. 6, p. 925, 1973.
Macromolecules, vol. 3, p. 175, 1970.
Macromolecules, vol. 4, p. 330, 1971.
Macromolecules, vol. 4, p. 475, 1971.
Makromol. Chem., vol. 152, p. 15, 1972.
Anal. Chem., vol. 43, p. 28A, 1971.
F.A. Bovey "High resolution NMR Spectroscopy of Polymers". 1971.
A. Zambelli "Research on Homopolymers and Copolymers of Propylene".

*Primary Examiner*—W. Robinson H. Clark
*Attorney, Agent, or Firm*—Spencer & Frank

[57] ABSTRACT

Composition containing, per 100 parts by weight of propylene polymer, from 0.05 to 5 parts by weight of a crystalline aluminosilicate exhibiting a water adsorption capacity, at 25° C. and at a water vapour partial pressure of 4.6 torr, of less than 10% by weight. Object manufactured from this composition.

21 Claims, No Drawings

COMPOSITION BASED ON PROPYLENE POLYMER AND OBJECT MANUFACTURED FROM THIS COMPOSITION

This application is a continuation of application Ser. No. 08/172,709, filed Dec. 27, 1993, now abandoned.

FIELD OF THE INVENTION

The invention relates to a composition based on propylene polymer containing a zeolite. It also relates to objects manufactured from this composition, in particular films.

TECHNOLOGY REVIEW

In Patent Application JP 83/11139, 100 parts by weight of polypropylene are mixed with 0.2 parts by weight of a zeolite called "CaA". The mixture thus obtained is melted at 221° C., granulated and converted into a film. The film thus obtained is then treated with aluminium to form a laminate.

Zeolites are hydrated crystalline alkali metal and alkaline-earth metal aluminosilicates of natural or synthetic origin. Various types of them exist (cf. for example D. W. BRECK, Wiley Interscience, 1974, pages 133–180).

A zeolite of type A is a sodium aluminosilicate characterized especially by an Si/Al molar ratio of approximately 0.7 to 1.2 and a water content of 22% by weight ("Zeolite molecular sieves" by D. W. BRECK, Wiley Interscience, 1974, page 133).

A mixture as employed in the known process comprising a zeolite of type A presents a disadvantage when it is granulated by a conventional granulating process which consists in introducing the mixture of polypropylene and zeolite into a hopper feeding an extruder, in conveying the mixture in the extruder as a melt, and in cutting the resin leaving the extruder into granules. In fact, such a mixture has been found to cause a rapid obstruction of the melt filter located in the melt stream at the extruder exit. Such an obstruction phenomenon makes it necessary to clean or replace the filter and consequently results in a production interruption or stoppage, which is industrially unacceptable.

SUMMARY OF THE INVENTION

The invention overcomes this disadvantage by providing a new composition based on propylene polymer containing a zeolite which, when mixed in the molten state and granulated, does not cause obstruction of the filters of a conventional granulator. Another objective of the invention is to provide a composition based on a propylene polymer which is relatively insensitive to thermal degradation, and which can be employed for the manufacture of films exhibiting good slip properties and, furthermore, adhesiveness to metals.

DETAILED DESCRIPTION OF THE INVENTION

To this end, the invention relates to a composition based on propylene polymer containing from 0.05 to 5 parts by weight of zeolite per 100 parts by weight of propylene polymer, in which the zeolite is a crystalline aluminosilicate exhibiting a water adsorption capacity, at 25° C. and at a water vapour partial pressure of 4.6 torr, not exceeding 10% of its weight.

For the purposes of the present invention, a zeolite intended to denote one or more zeolites corresponding to the specifications defined above. Similarly, propylene polymer is intended to denote one or more propylene polymers.

One of the essential properties of the zeolite of the composition according to the invention is its hydrophobic nature, measured by its water adsorption capacity at 25° C. at a water vapour partial pressure of 4.6 torr. This adsorption capacity preferably does not exceed 6% of its weight. Such a low water content can be obtained by removing the water of hydration by any suitable known means making it possible to remove any substance plugging the pores of the zeolite, such as, for example, a calcination or washings.

The zeolite of the composition according to the invention preferably has an Si/Al molar ratio, in the crystal lattice, of at least 35. In general the ratio does not exceed 5,000. It is preferably from 200 to 500.

The zeolite of the composition according to the invention advantageously has a mean pore diameter of at least 5.5 Å, in particular of at least 6.2 Å. In general the mean diameter does not exceed 20 Å, preferably does not exceed 15 Å.

In the majority of cases the zeolite of the composition according to the invention corresponds to the general formula $$xM_{2/n}O.Al_2O_3.ySiO_2.zH_2O$$

in which M denotes an element of groups IA and IIA of the Periodic Table, n denotes the valency of M, x, y and z denote numbers greater than 0, y being at least equal to 70 and z being such that the water content of the zeolite does not exceed 10% of its weight. Sodium, potassium, magnesium and calcium may be mentioned as typical examples of the element M. In most cases M is sodium or calcium. Zeolites which are particularly preferred contain not more than 2.4% by weight of aluminium oxide and not more than 5% by weight of sodium oxide.

The zeolite of the composition according to the invention is generally in the form of particles with a mean diameter not exceeding 10 μm, preferably not exceeding 8 μm. The mean diameter is usually at least 0.1 μm, in particular at least 1 μm, values from 1 to 5 μm being those most recommended, for example approximately 3 μm. The zeolite particles advantageously have a specific surface, measured by the volumetric nitrogen entry method according to British Standard BS 4359/1 (1984), of at least 200 m²/g, preferably at least 300 m²/g, more particularly at least 400 m²/g. The specific surface generally does not exceed 1,000 m²/g; it is preferably not more than 800 m²/g.

Zeolites which are very particularly advantageous in the composition according to the invention are those described in U.S. Pat. No. 4,795,482.

According to the invention the composition contains one or more zeolites in a total quantity of 0.05 to 5 parts by weight per 100 parts by weight of propylene polymer. Particularly satisfactory results are obtained with total zeolite contents of at least 0.08 parts by weight, values of at least 0.1 part by weight being those most recommended; the total zeolite content is advantageously at most 1 part by weight, maximum total contents of 0.5% being very particularly preferred.

The composition according to the invention also contains at least one propylene polymer. Propylene polymer is intended to denote propylene homopolymers and propylene copolymers which are well known to a person skilled in the art, and mixtures thereof. In general, the propylene copolymers contain at least 50% by weight of propylene, preferably at least 75% by weight.

The propylene polymers generally have a melt index, measured at 230° C. under a 2.16 kg load according to ASTM Standard D 1238 (1986) of 0.1 to 100 g/10 min, in particular from 0.2 to 50, values from 1 to 10 being the most common ones, those from 2 to 6 being the preferred ones.

In most cases, the homopolymers are additionally characterized by an isotacticity value greater than 0.92, values from 0.93 to 0.98 being recommended. The isotacticity value of the polymer is intended to denote the molar fraction of isotactic triads (block chain sequence of three propylene monomer units in a meso configuration) in the total polymer. This value is determined by $^{13}C$ nuclear magnetic resonance as described in Macromolecules, Volume 6, No. 6, page 925 (1973) and in references (3) to (9) in this publication.

Furthermore, the propylene homopolymers usually have a torsional rigidity modulus of 500 to 900 daN/cm$^2$, measured at 23° C. and with a torsion angle of 60° of arc, the mould temperature being set at 70° C. and the conditioning period at 5 minutes [ASTM Standard D 1043 (1984)]. The rigidity modulus is preferably from 550 to 770 daN/cm$^2$.

The propylene copolymers may be chosen from random copolymers and block copolymers containing at least two blocks of different chemical composition, which are well-known to a person skilled in the art. Random copolymers are preferred. The copolymers may contain a single comonomer or a number of different comonomers. The comonomers may contain up to 12 carbon atoms. The comonomers may, for example, be chosen from alpha-olefins, preferably those containing up to 12 carbon atoms, such as ethylene, butene, hexene, 4-methyl-1-pentene, octene and decene. Diolefins can also be suitable as comonomers. The preferred comonomers are ethylene and butene.

Among the propylene polymers preference is given to the copolymers containing from 0.05 to 20% by weight of comonomer, contents from 0.1 to 10% by weight being more particularly recommended. The comonomer content is measured by infrared spectrography and estimated from the band measured at 732 cm$^{-1}$. Propylene copolymers which have produced advantageous results are the copolymers containing 0.1 to 3% by weight of ethylene. They may also be copolymers containing from 0.1 to 3% by weight of butene. Good results can also be obtained with copolymers containing both ethylene in a quantity of 0.1 to 3% by weight and butene in a quantity of 1 to 20% by weight.

The propylene polymers involved in the composition according to the invention may be obtained by any known polymerization process, such as polymerization in gas phase, in suspension or in solution, in the presence of any type of catalyst capable of polymerizing propylene optionally in the presence of a comonomer, such as, for example, catalysts based on TiCl$_3$ and catalysts based on TiCl$_4$ supported on magnesium dichloride. The propylene polymers may be obtained in a continuous or non-continuous process, in a single reactor or in a number of reactors arranged in series.

Besides the propylene polymer and the zeolite, the composition according to the invention may also contain usual additives such as stabilizers (for example anti-acids, anti-oxidants and/or anti-UV), organic or inorganic colorants (such as, for example, titanium or iron oxides) or antistatic agents. The content of each of the additives is generally less than 10 parts by weight per 100 parts by weight of propylene polymer.

The composition according to the invention may be obtained by any suitable known means, for example by mixing the propylene polymer with the zeolite at ambient temperature, followed by mixing at a temperature above the melting temperature of the polymer, for example in a mechanical mixer or in an extruder. An alternative method consists in introducing the zeolite into the polymer which is already molten.

The procedure is preferably in two successive stages, the first consisting in mixing the propylene polymer, the zeolite and optionally one or more additives at ambient temperature, the second step consisting in continuing the mixing in the melt in an extruder. The temperature in the second stage is generally from 100° to 300° C., in particular from 120° to 250° C., in particular from approximately 130° to 210° C.

The composition according to the invention offers the advantage that it can be granulated using the granulating processes commonly employed for polymers without blocking the melt filter located in the melt stream at the extruder exit. Another advantage of the composition according to the invention lies in its low sensitivity to thermal degradation, which is reflected in a low yellowing value of the objects formed by melt-processing of the composition.

The composition according to the invention is capable of being processed by any of the conventional processes for manufacturing shaped objects of propylene polymer and more particularly by the extrusion, blow extrusion, extrusion-thermoforming and injection moulding processes. It is suitable for the manufacture of shaped objects, more particularly of shaped objects intended for packaging, such as foils, sheets, containers, bags, sachets or tubes. It is particularly suitable for the manufacture of films, because it provides these films with good slip properties and, furthermore, adhesiveness to metals.

Consequently, the present invention also relates to the objects manufactured from the composition according to the invention, in particular films. The latter may consist of monofilms comprising a single layer manufactured from the composition according to the invention. They may also be films comprising a number of coextruded layers ("multilayers") at least one layer of which, preferably an outer one, is manufactured from the composition according to the invention.

In particular, the films obtained from the composition according to the invention exhibit good adhesiveness to metals and are therefore capable of being metallized by any known metallizing process such as, for example, vacuum evaporation. Consequently, the present invention also relates to metallizable films obtained from the composition according to the invention.

EXAMPLES

The examples whose description follows serve to illustrate the invention. Examples 2 and 4 are given by way of comparison. The meaning of the symbols employed in these examples, the units expressing the quantities mentioned and the methods of measurement of these quantities are detailed below.

MFI= melt index of the polymer, measured at 230° C. under a 2.16 kg load according to ASTM Standard D 1238 (1986).

YI=yellowing index, measured according to ASTM Standard D 1925 (1988).

[Et]=ethylene content of the propylene copolymer, measured by infrared spectrography and estimated from the band measured at 732 cm$^{-1}$.

Example 1 (in accordance with the invention)

In this example a composition based on a propylene polymer containing a zeolite corresponding to the specifications defined above was prepared. A blend containing 100 parts by weight of a random copolymer of propylene exhibiting an ethylene concentration [Et] of 0.4% by weight and an MFI of 3.4 g/10 min, 0.03 parts by weight of hydrotalcite, 0.1 part by weight of pentaerythrityl tetrakis-3-(3,5-di-tertbutyl-4-hydroxyphenyl)propionate, 0.1 part by weight of tetrakis(2,4-di-tert-butylphenyl)4,4'-biphenylylene diphosphonite and 0.1 parts by weight of the zeolite ABSCENTS® 3000 produced by UOP (presenting an Si/Al molar ratio higher than 35, a mean pore diameter greater than 5.5 Å and a water adsorption capacity lower than 10% by weight), was fed to the feed section of a ZSK-240 extruder. The molten polymer was brought to a temperature of 240° C. and passed through a 50×250 Dutch weave melt filter (62 µm). The molten polymer was quenched and cut into pellets under water. No obstruction of the filter located in the melt stream at the extruder exit was observed after several hours' running.

Example 2 (reference)

In this example a composition based on a propylene polymer containing a zeolite exhibiting an Si/Al ratio lower than 35 and a water adsorption capacity higher than 10% by weight (at least (at least 21.5% by weight) was prepared.

A blend containing 100 parts by weight of a random propylene copolymer exhibiting an ethylene concentration [Et] of 3.4% by weight and an MFI of 5 g/10 min, 0.24 parts by weight of a mixture containing 50% of pentaerythrityl tetrakis-3-(3,5-di-tert-butyl-4-hydroxyphenyl)propionate and 50% of tris(2,4-di-tert-butyl-phenyl) phosphite and 0.3 parts by weight of the zeolite called "5A", produced by Union Carbide, was prepared at room temperature. This mixture was fed to a ZSK-170 twin screw extruder comprising 5 successive zones, being respectively at a temperature of 190°, 265°, 250°, 215° and 255° C. and passed through a 55 µm melt filter. The molten polymer coming out of the extruder was quenched and cut into pellets under water.

Obstruction of the melt filter located in the melt stream at the extruder exit was observed after 15 minutes' running, and pelletizing had to be interrupted. A comparison of the result of Example 2 with that of Example 1 reveals the progress brought about by the invention insofar as the feasibility of a granulation of long duration, as practiced on an industrial scale, is concerned.

Example 3 (in accordance with the invention)

In this example a composition based on a propylene polymer containing a zeolite corresponding to the specifications defined above was prepared. A blend containing 100 parts by weight of a random copolymer of propylene exhibiting an ethylene concentration [Et] of 0.4% by weight and an MFI of 2.7 g/10 min, 0.03 parts by weight of hydrotalcite, 0.1 part by weight of pentaerythrityl tetrakis-3-(3,5-di-tert-butyl-4-hydroxyphenyl)propionate, 0.1 part by weight of tetrakis(2,4-di-tert-butylphenyl)-4,4'-biphenylylene diphosphonite and 0.2 parts by weight of the zeolite ABSCENTS 3000 produced by UOP (presenting an Si/Al molar ratio higher than 35, a mean pore diameter greater than 5.5 Å and a water adsorption capacity lower than 10% by weight), was prepared in a Henschel blender and mixed for 90 seconds at room temperature. This mixture was placed in the hopper of a 30-mm twin screw extruder comprising 5 successive zones, being respectively at a temperature of 130°, 170°, 180°, 200° and 210° C. The strands of molten polymer coming out of the extruder were quenched in water and air-dried before pelletizing. The product obtained had a YI of 5.5.

Example 4 (reference)

The operations of Example 3 were repeated, the zeolite ABSCENTS 3000 being replaced with a zeolite called "13X", produced by UOP. According to the definition given by the work "Zeolite molecular sieves" by D. W. BRECK, Wiley Interscience, 1974, page 176, zeolite 13X exhibits an Si/Al molar ratio of 1 to 1.5.

The product obtained had a YI of 18.8.

A comparison of the result of Example 4 with that of Example 3 reveals the progress brought about by the invention with regard to the yellowing index and hence the sensitivity to thermal degradation.

What is claimed is:

1. A composition comprising a propylene polymer containing from 0.05 to 5 parts by weight of zeolite per 100 parts by weight of propylene polymer, in which the zeolite is a crystalline aluminosilicate exhibiting a Si/Al molar ratio, in the crystal lattice, of at least 35, and a water adsorption capacity, at 25° C. and at a water vapor partial pressure of 4.6 torr, not exceeding 10% of its weight, said composition adapted to adhere to metal.

2. The composition according to claim 1, wherein the zeolite exhibits a water adsorption capacity, at 25° C. and at a water vapour partial pressure of 4.6 torr, not exceeding 6% of its weight.

3. The composition according to claim 1, wherein the zeolite exhibits an Si/Al molar ratio, in the crystal lattice, of from 200 to 500.

4. The composition according to claim 1, wherein the zeolite exhibits a mean pore diameter of at least 5.5 Å.

5. The composition according to claim 4, wherein the zeolite exhibits a mean pore diameter which does not exceed 15 Å.

6. The composition according to claim 1, wherein the zeolite corresponds to the formula

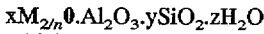

in which M denotes an element of groups IA and IIA of the Periodic Table, n denotes the valency of M, and x, y and z denote numbers greater than 0, y being at least equal to 70 and z being such that the water content of the zeolite does not exceed 10% of its weight.

7. The composition according to claim 1 wherein the zeolite is in the form of particles with a mean diameter of 1 to 5 µm and a specific surface of at least 400 m$^2$/g as measured by the volumetric nitrogen entry method according to British Standard BS 4359/1 (1984).

8. The composition according to claim 1, containing from 0.08 to 0.5% by weight of zeolite per 100 parts by weight of propylene polymer.

9. The composition according to claim 1, wherein the propylene polymer is a propylene copolymer containing from 0.05 to 20% by weight of one or more comonomers containing up to 12 carbon atoms.

10. The composition according to claim 9, wherein the propylene copolymer contains from 0.1 to 3% by weight of ethylene.

11. The composition according to claim 9, wherein the propylene copolymer contains from 0.1 to 3% by weight of ethylene and from 1 to 20% by weight of butene.

12. The composition according to claim 1, wherein the propylene polymer exhibits a melt index, measured at 230° C. under a 2.16 kg load, of 1 to 10 g/10 min.

13. An object manufactured from the composition according to claim 1.

14. The object according to claim 13, being a film.

15. The object according to claim 14, being a film adhered to metal.

16. The composition according to claim 1, wherein said propylene polymer contains from 0.08 to 1 part by weight of zeolite per 100 parts by weight of propylene polymer.

17. A film comprising a propylene polymer containing from 0.05 to 5 parts by weight of zeolite per 100 parts by weight of propylene polymer, in which the zeolite is a crystalline aluminosilicate exhibiting a water adsorption capacity, at 25° C. and at a water vapor partial pressure of 4.6 torr, not exceeding 10% of its weight, said film adapted to adhere to metal.

18. A film comprising a propylene polymer containing from 0.08 to 1 part by weight of zeolite per 100 parts by weight of propylene polymer, in which the zeolite is a crystalline aluminosilicate exhibiting a water adsorption capacity, at 25° C. and at a water vapor partial pressure of 4.6 torr, not exceeding 10% of its weight, said film adapted to adhere to metal.

19. In a process of adhering a metal to a polymer film, the improvement comprising a film comprising a propylene polymer containing from 0.05 to 5 parts by weight of zeolite per 100 parts by weight of propylene polymer, in which the zeolite is a crystalline aluminosilicate exhibiting a water adsorption capacity, at 25° C. and at a water vapor partial pressure of 4.6 torr, not exceeding 10% of its weight.

20. A composition comprising a propylene polymer containing from 0.08 to 1 part by weight of zeolite per 100 parts by weight of propylene polymer, in which the zeolite is a crystalline aluminosilicate exhibiting a Si/Al molar ratio, in the crystal lattice, of at least 35, and a water absorption capacity, at 25° C. and at a water vapor partial pressure of 4.6 torr, not exceeding 10% of its weight said composition adapted to adhere to metal.

21. A composition comprising a propylene polymer containing from 0.08 to 0.5% by weight of zeolite per 100 parts by weight of propylene polymer, in which the zeolite is a crystalline aluminosilicate exhibiting a Si/Al molar ratio, in the crystal lattice, of at least 35, and a water adsorption capacity, at 25° C. and at a water vapor partial pressure of 4.6 torr, not exceeding 10% of its weight said composition adapted to adhere to metal.

\* \* \* \* \*